United States Patent [19]
Shiba et al.

[11] 3,840,376
[45] Oct. 8, 1974

[54] SUPERSENSITIZED COLOR PHOTOGRAPHIC MATERIAL

[76] Inventors: Keisuke Shiba; Masanao Hinata; Yasushi Oishi; Yoshinosu Yoshida; Akira Sato, all of No. 210, Nakanuma, Minami, Ashigara-machi, Ashigara-Kamigun, Kanagawa, Japan

[22] Filed: Apr. 28, 1972

[21] Appl. No.: 248,691

[30] Foreign Application Priority Data
Apr. 30, 1971 Japan.................................. 46-28793

[52] U.S. Cl............................ 96/99, 96/3, 96/29 D, 96/77, 96/124, 96/131, 96/137
[51] Int. Cl............................ G03c 1/10, G03c 1/14
[58] Field of Search............ 96/124, 29 D, 3, 77, 99

[56] References Cited
UNITED STATES PATENTS

| | | | |
|---|---|---|---|
| 2,983,606 | 5/1961 | Rogers.................................. | 96/29 D |
| 3,348,949 | 10/1967 | Bannert et al........................ | 96/124 |
| 3,397,060 | 8/1968 | Schwan et al........................ | 96/124 |
| 3,577,236 | 5/1971 | Fix......................................... | 96/3 |
| 3,615,543 | 10/1971 | Rosenoff................................ | 96/3 |
| 3,617,294 | 11/1971 | Shiba et al............................ | 96/124 |
| 3,622,316 | 11/1971 | Bird et al.............................. | 96/3 |
| 3,666,480 | 5/1972 | Shiba et al............................ | 96/124 |
| 3,718,475 | 2/1973 | Shiba et al............................ | 96/124 |

*Primary Examiner*—J. Travis Brown
*Attorney, Agent, or Firm*—Sughrue, Rothwell, Mion, Zinn & Macpeak

[57] ABSTRACT

A green-sensitive silver halide photographic emulsion for use in photographic materials containing dye developers suitable for the diffusion transfer process containing, in combination, at least one of the sensitizing dyes represented by the formula I.

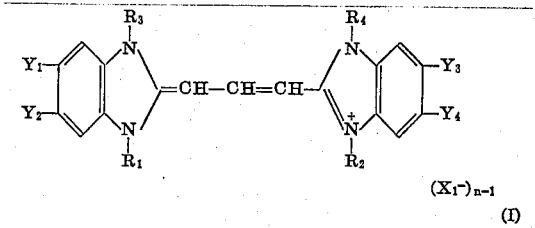

(I)

wherein $R_1$, $R_2$, $R_3$ and $R_4$ are each selected from the group consisting of an alkyl group which is conventionally used in cyanine dyes and an allyl group, at least one of $R_1$ and $R_2$ being an alkyl group or a substituted alkyl group containing a group selected from the group consisting of a carboxyl group and a sulfo group; $Y_1$ and $Y_2$ are each selected from the group consisting of a hydrogen atom and a halogen atom, $Y_2$ and $Y_4$ are each selected from the group consisting of a hydrogen atom, a halogen atom, an alkoxy group, an amino group, an acylamido group, an acyloxy group, an alkoxycarbonylamino group, a cyano group, a trifluoromethyl group, an alkylsulfonyl group, a sulfamyl group, an alkylaminosulfonyl group, a morpholinosulfonyl group, an alkoxycarbonyl group, and a piperidinosulfonyl group, $X_1$ represents an anion and $n$ is an integer of from 1 to 2, said dye forming an intramolecular salt when $n$ is 1, and at least one of the sensitized dyes represented by the formula II

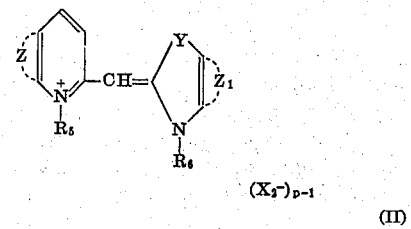

(II)

wherein Y is selected from the group consisting of a sulfur atom and a selenium atom, Z represents a divalent group necessary to form a benzene ring, which may be substituted, $Z_1$ represents a divalent group necessary to form a benzene ring, which may be substituted, $R_5$ and $R_6$ are each selected from the group consisting of an alkyl group, a substituted alkyl group which is conventionally present in cyanine dyes and an allyl group, at least one of $R_5$ and $R_6$ being an alkyl group or a substituted alkyl group containing a group selected from the group consisting of a carboxyl group and a sulfo group, $X_2$ is an anion, $p$ is an integer of from 1 to 2, said dye forming an intramolecular salt when $p$ is 1, is disclosed.

26 Claims, 2 Drawing Figures

PATENTED OCT 8 1974
3,840,376

SUPERSENSITIZED COLOR PHOTOGRAPHIC MATERIAL

BACKGROUND OF THE INVENTION

1. Field of the Invention

This invention relates to spectral sensitization of a photographic material for use in the diffusion transfer process containing dye developers suitable for the diffusion transfer process. More particularly, it relates to green sensitization of the photographic material for the diffusion transfer process.

2. Description of the Prior Art

A compound containing a dye moiety and a silver halide developing moiety in its molecule is an indispensable material in a photographic element for forming color images by the diffusion transfer process. This compound is generally called "dye developer."

It is well known, as disclosed in U.S. Pat. No. 2,938,606, British Patent No. 804,971, French Patent No. 1,313,767 etc., that when a light sensitive material containing a dye developer and a silver halide is exposed to light and processed with an alkaline processing composition, development proceeds in the exposed area, and the dye developer changes to a substantially non-diffusible form, while the dye developer in the unexposed area diffuses and forms a color transfer image, i.e., a positive image by its being brought into close contact with the image-receiving element, since the gradation of the image is inversely proportional to the amount of the exposure.

The dye developers used in the present invention are widely disclosed in the literature. In a diffusion transfer process, such developers function as a silver halide developer and as a dye. Dye developers are substantially non-diffusible at a neutral pH in colloid layers such as the hydrophilic organic colloids used in photographic emulsion but are diffusible in such emulsions in the presence of alkaline processing solutions. The useful dye developers are disclosed in, for example, Australian Patent No. 220,279, German Patent No. 1,036,640, British Pat. Nos. 804,971, 804,973 – 804,975, Belgian Patent No. 554,935, French Pat. Nos. 1,168,292, 1,313,765, Canadian Pat. Nos. 577,021, 579,038, and U.S. Pat. Nos. 3,320,063, 3,255,001, 2,992,106, 3,297,441, 3,134,762, 3,236,643, 3,134,763, 3,236,645, 3,134,764, 3,134,672, 3,134,765, 3,183,089, 3,135,734, 3,135,604, 3,173,906, 3,222,169, 3,183,090, 3,201,384, 3,246,985, 3,208,991, 3,142,565, 3,218,312, 3,230,086, 3,262,924, 3,275,617, 3,077,402, 3,282,913, 3,141,772, 3,299,041, 2,983,605, 3,047,386, 3,076,820, 3,173,929, 3,230,083, 3,236,864, 3,239,339, 3,252,969, 3,253,001, 3,288,778, 3,209,016, 3,135,606, 3,076,808, 3,126,280, 3,236,865, 3,135,605, 3,255,205, 3,131,061, 3,347,673, 3,347,672, 3,246,016, 3,245,790, 3,086,005, 3,295,973, 3,307,947, 3,230,082, 3,230,085, 3,019,107, 3,019,254, 3,022,354, 3,256,269, 3,230,084, 3,232,995, 3,236,873, 3,252,990, 3,309,199, etc.

Generally, dye developers are compounds which contain a dye moiety and at least one moiety having a silver halide developing function in the dye developer molecule. By the term "silver halide developing function" is meant a moiety suitable for developing the exposed silver halide. The preferable silver halide developing function is a hydroquinonyl group. The developing function may also be an ortho-dihydroxyphenyl group, an ortho- and a para-amino substituted hydroxyphenyl group. Generally, the developing function includes a benzenoid developing moiety, that is, an aromatic developing moiety which forms a quinonoid, i.e., a quinone substance upon oxidation. Among the various dye developers, the typical useful dye moiety is an azo or anthraquinone dye moiety. In this specification, a dye developer containing an azo dye moiety is called an azo dye developer and a dye developer having an anthraquinone dye moiety is called an anthraquinone dye developer.

As is well known to those skilled in the art, the dye developers represented by the azo and anthraquinone dye developers cause densensitization of the silver halide photographic emulsion, and this desensitization is particularly marked in a spectrally sensitized silver halide emulsion, however in this case, absorption by the dye developer is taken into account. The desensitization activity caused by the dye developer has been noted not only where the dye developer was added directly to a silver halide emulsion layer spectrally sensitized in the green region, but also where the dye developer was not added directly to the green sensitive emulsion layer, that is, where the dye developer layer was provided over or under the light sensitive layer. This is believed to be due to the partial diffusion of the dye developer contained in the dye developer layer into the light sensitive layer.

An object of this invention is to provide a green sensitive emulsion layer having a high green sensitivity in the presence of a dye developer in a silver halide light sensitive element suitable for the diffusion transfer process.

SUMMARY OF THE INVENTION

The above object of this invention can be accomplished by green-sensitizing a silver halide emulsion by using a combination of at least one of the sensitizing dyes represented by the general formula (I) and in which, $R_1$, $R_2$, $R_3$ and $R_4$ are selected from the group consisting of an alkyl group, a substituted alkyl group conventionally used in cyanine dyes, an aralkyl group, and an allyl group, at least one of $R_1$ and $R_2$ being an alkyl group containing a carboxy group or a sulfo group, $Y_1$ and $Y_3$ are selected from the group consisting of a hydrogen atom and a halogen atom, $Y_2$ and $Y_4$ are each selected from the group consisting of a hydrogen atom, a halogen atomm, an alkoxy group, an amino group, an acylamido group, an acyloxy group, an alkoxycarbonylamino group, a cyano group, a trifluoromethyl group, an alkylsulfonyl group, a sulfamyl group, an alkylaminosulfonyl group, an alkoxycarbonyl group, a morpholinosulfonyl group and a piperidino sulfonyl group, $X_1$ represents an anion, $n$ is an integer of from 1 to 2, the dye forming an intramolecular salt when $n$ is 1, and at least one of the sensitizing dyes represented by the formula (II)

(II)

in which y is selected from the group consisting of a sulfur atom and a selenium atom, Z is a divalent group necessary to form a benzene ring which may be unsubstituted or substituted with substituents selected from the group consisting of a halogen atom, a hydroxy group, an alkyl group, and an alkoxy group, $Z_1$ represents a divalent group necessary to form a benzene ring which may be unsubstituted or substituted with substituents selected from the group consisting of an alkyl group, a halogen atom, an alkoxy group and a hydroxyl group, $R_5$ and $R_6$ each are selected from the group consisting of an alkyl group and a substituted alkyl group conventionally used in cyanine dyes, at least one of $R_5$ and $R_6$ being an alkyl group containing a carboxy group or a sulfo group, $X_2$ is an anion, p is an integer of 1 or 2, the dye forming an intramolecular salt when $n$ is 1.

DETAILED DESCRIPTION OF THE INVENTION

In the general formula (I)

(I)

$R_1$, $R_2$, $R_3$ and $R_4$ are selected from the group consisting of an alkyl group (for example, ethyl, n-propyl, n-butyl), a substituted alkyl group which is commonly present in cyanine dyes such as a hydroxyalkyl group, (for example, 2-hydroxyethyl, 4-hydroxybutyl), an acetoxyalkyl groups (for example, 2-acetoxyethyl, 3-acetoxypropyl), an alkoxyalkyl group (for example, 2-methoxyethyl, 4-butoxybutyl), a carboxy-containing alkyl group (for example, a carboxyalkyl group such as 2-carboxyethyl, 3-carboxypropyl, a carboxyalkoxyalkyl group such as 2-(2-carboxyethoxy) ethyl, a carboxyaralkyl group, such as p-carboxybenzyl), an alkyl group containing a sulfo group (for example, a sulfoalkyl group, such as 2-sulfoethyl, 3-sulfopropyl, 3-sulfobutyl, 4-sulfobutyl, a sulfohydroxyalkyl group such as 2-hydroxy-3-sulfopropyl, a sulfoalkoxyalkyl group such as 2-(3-sulfopropoxy)ethyl, an sulfoacetoxyalkyl group such as 2-acetoxy-3-sulfopropyl, a sulfoalkoxyalkoxyalkyl group such as 3-methoxy-2-(3-sulfopropoxy)propyl, 2-[2-(3-sulfopropoxy)ethoxy]ethyl, a sulfoalkoxyhydroxy-alkyl group such as 2-hydroxy-3-(3'-sulfopropoxy)propyl, a sulfoaralkyl group such as p-sulfophenethyl, p-sulfobenzyl), an aralkyl group (for example, benzyl and phenylethyl) and an allyl group, at least one of $R_1$ and $R_2$ being an alkyl group containing a carboxy group or a sulfo group, $Y_1$ and $Y_3$ are selected from the group consisting of a hydrogen atom and a halogen atom such as chlorine, bromine, iodine, and fluorine, $Y_2$ and $Y_4$ are selected from the group consisting of a hydrogen atom, a halogen atom such as chlorine, bromine, iodine and fluorine, an alkoxy group such as methoxy, ethoxy, and butoxy, and an amino group such as amino, methylamino and dimethylamino, an acylamido group such as acetoamido, an acyloxy group such as acetoxy, an acetoamido, an acyloxy group such as acetoxy, an alkoxycarbonylamino group such as ethoxycarbonylamino, a cyano group, a trifluoromethyl group, an alkylsulfonyl group such as methylsulfonyl, a sulphamyl group, an alkylaminosulfonyl group such as ethylaminosulfonyl, diethylaminosulfonyl, a morpholinosulfonyl group, and a piperidinosulfonyl group, an alkoxycarbonyl group such as methoxycarbonyl and ethoxycarbonyl, $X_1$ represents an anion such as chlorine ion, a bromine ion, an iodine ion, a thiocyanic acid ion, a sulfonic acid ion, a perchloric acid ion, a p-toluenesulfonic acid ion, a methyl sulfuric acid ion, and an ethyl sulfuric acid ion, $n$ is an integer of from 1 to 2, the dye forming an intramolecular salt when $n$ is 1.

In the general formula (II)

(II)

Y is selected from the group consisting of sulfur and selenium atoms, Z is a divalent group necessary to form a benzene ring which may be unsubstituted or substituted with such substituents as a halogen atom (for example, chlorine and fluorine), a hydroxy group, an alkyl group (for example, methyl and ethyl), and an alkoxy group (for example, methoxy and ethoxy), $Z_1$ represents a divalent group necessary to form a benzene ring which may be unsubstituted or substituted which such substituents as an alkyl group (for example, methyl and ethyl), a halogen atom (for example, fluorine and chlorine), an alkoxy group (for example, methoxy and ethoxy) and a hydroxyl group, $X_2$ has the same significance as $X_1$, and $p$ has the same significance as $n$, $R_5$ and $R_6$ are selected from the group consisting of a substituted and unsubstituted alkyl group which is conventionally present in cyanine dyes, at least one of $R_5$ and $R_6$ being an alkyl group having a carboxy group or a sulfo group.

The sensitizing dyes used in the present invention are the well-known dyes. Some of the dyes represented by the formula (I) are disclosed in U.S. Pat. No. 2,912,329 and British Patent No. 1,020,295 and the like, and can easily to prepared by those skilled in the art by referring to the specification of the above patents and the dyes which are not specifically disclosed can be easily prepared in a similar manner using techniques described therein.

The sensitizing dyes represented by the formula (II) are disclosed in British Patent No. 742,112 and U.S. Pat. No. 3,619,197 and the like, and can easily be prepared by those skilled in the art by referring to the specification of the above patents and the dyes which are not specifically disclosed can be easily prepared in a similar manner using techniques described therein.

Suitable examples of the sensitizing dyes which can be used in the present invention are given below but they are not to be construed as limiting the present invention.

Dye I-9......

Dye II-1......

Dye II-2......

Dye II-3......

Dye II-4......

Dye II-5......

Dye II-6......

Dye II-7......

Dye II-8......

Dye II-9......

Preferred embodiments of the Dyes of the general formula I are those in which $Y_2$, $Y_3$ and $Y_4$ are halogen atoms and of the Dyes of the general formula II are those having the general formula (II')

in which R represents a hydrogen atom or an alkyl group such as methyl or ethyl and Y, $R_5$, $R_6$, $X_2$, and $p$ are as hereinbefore defined.

In the diffusion transfer process, a single or multicolored image can be obtained in the various known methods by using a color image-forming substance of the type such as the dye developers set forth above.

One of the methods for obtaining a color transfer image using a dye developer is to deposit at least two selectively sensitized photosensitive layers on a support and to process the layers simultaneously and concurrently together with a single common image-receiving layer.

Figure 1:
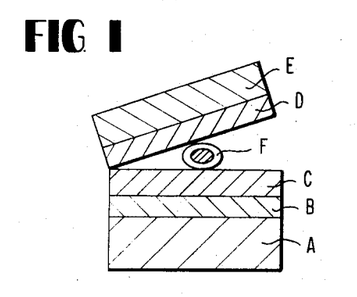
FIG. 1 is a sectional view showing an embodiment of preparing a single colored diffusion transfer image.

One of the embodiments for obtaining a single colored transfer image is illustrated in FIG. 1 of the accompanying drawings. In FIG. 1, a light sensitive element comprises a support A, a layer B which contains a colored image forming element and a silver halide emulsion layer C. In addition, a rupturable container F which contains an alkaline processing composition is placed on the light-sensitive element, the light-sensitive element being separated from the alkaline processing composition. On the other hand, an image-receiving element comprises a support E and an image-receiving layer D. After exposure to light, the image-receiving element is deposited on the light sensitive element, the rupturable container F is broken by applying an appropriate pressure, for example, by passing the assembly between a pair of rolls opposing each other and having appropriate grooves (not shown in the drawing), to spread the liquid alkaline processing composition in a layer between the image-receiving element and the light sensitive element. The processing composition penetrates into the silver halide emulsion to develop the latent image contained therein. The color image forming element transfers from the unexposed region to the image-receiving element to form thereon a positive color image by the exposure. After at least a part of the color image forming element has transferred, the image-receiving element is separated from the light-sensitive element.

The silver halide emulsion layer comprises a support bearing thereon, for example, a blue sensitive emulsion layer and a red sensitive emulsion layer, these emulsion layers containing magenta and cyan dye developers, respectively. The dye developers may be incorporated into the silver halide emulsion layer, for example, in a form of oil droplets, or into a layer which is positioned below a suitable silver halide emulsion layer. In the latter case, sets of the silver halide emulsion layer and the dye developer layer are separated from each other by a suitable interlayer comprising, for example, gelatin or polyvinyl alcohol.

The color photographic material of this type is composed of a support coated thereon with a red, green and blue sensitive emulsion layers, these layers containing cyan, magenta and yellow dye developers, respectively. The manner of incorporation of the dye developers and the position of these layers are the same as described above.

Another method for obtaining a multi-colored image involves appropriate numbers of image-receiving elements and comprises the use of a plurality of light sensitive elements which can be processed with more than one liquid processing composition. In this method, an appropriate dye developer is incorporated into a light sensitive element. Representative examples of film structures of this type are disclosed in U.S. Pat. No. 2,647,049.

Still another method for obtaining a multi-colored image comprises the use of a light sensitive silver halide emulsion layer consisting of at least two sets of selectively sensitized, minute photo sensitive elements disposed in a form of a light sensitive screen. More specifically, each of the minute light sensitive elements contain a suitable dye developer in a silver halide emulsion or under the silver halide emulsion. For example, the layer comprises a light sensitive screen of a minute green sensitive emulsion element and a fine red sensitive emulsion element disposed in contact with each other in the screen pattern, these emulsion elements containing magenta and cyan dye developers, respectively. Light sensitive screens suitable for subtractive color photography are disposed in contact with each other in the screen pattern and they consist of a minute red sensitive emulsion, a minute green sensitive emulsion and a minute blue sensitive emulsion combined with a cyan, magenta and yellow image forming dye developers, respectively. The transfer process of this type is disclosed in U.S. Pat. Nos. 2,968,554 and 2,983,606.

For the green sensitive emulsion used in the present invention, a cyan, magenta or yellow dye developer as well as other dye developers such as black dye developer or a mixture of dye developers can be used.

The dye developer used in the present invention may be introduced in the light sensitive elements, for example, in, upon or under each of the silver halide emulsions. This dye developer layer can be coated by using a coating solution containing from about 0.5 to about 8 percent by weight of the dye-stuff dispersed in a colloidal binding material such as gelatin or dissolved in a synthetic polymeric binding material such as phthalic cellulose hydrogenacetate.

The alkaline processing composition which can be used in the present invention comprises an aqueous solution containing at least one of the alkaline compounds, such as diethylamine, sodium hydroxide, potassium hydroxide or sodium carbonate. When the composition is applied to an emulsion preferably in a form of relatively thin and uniform layer, it may contain a film-forming and viscosity-increasing compound capable of forming a relatively hard and stable film when the composition is spread and dried. Preferred film-forming materials are high molecular weight polymer compounds such as water soluble polymeric ethers which are inert to the alkaline processing composition, for example, hydroxyethyl cellulose and sodium carboxymethyl cellulose. Other film-forming materials for which the viscosity increasing ability thereof is not substantially affected when it is allowed to stand in the processing solution for a long period of time, may also be used. Further, an alkaline processing composition containing a mordant, as disclosed in Japanese Patent Publication No. 6449/63 may be used. Examples of suitable alkaline processing compositions are given hereinafter in the examples of the present invention. In some cases, it may be preferable, in accordance with the technique disclosed in U.S. Pat. No. 3,087,816, to apply the alkaline processing composition on the light sensitive element prior to exposure.

The alkaline processing composition may also contain an auxiliary developer, i.e., a developinng accelerator such as p-methylaminophenol, 2, 4-diaminophenol, p-benzylaminophenol, hydroquinone, toluhydroquinone, phenylhydroquinone and 4'-methylphenylhydroquinone, or may contain a plurality of auxiliary developers such as a 3-pyrazolidone developer and a benzenoid developer, as disclosed in U.S. Pat. No. 3.039,869. Examples of combinations of the auxiliary developers are 1-phenyl-3-pyrazolidone and p-benzylaminophenol and 1-phenyl-3-pyrazolidone and 2, 5-bis-ethyl-aminohydroquinone. These auxiliary developers can be used in an alkaline processing composition or at least a part thereof can be incorporated previously in a silver halide emulsion layer or a dye developer layer. The auxiliary developers play a 37 catalytic" role where oxidation and reduction are repeated in the dye developer-auxiliary developer — exposed silver halide system.

The azo dye developers which can be used in the present invention are well-known compounds and are described in U.S. Pat. No. 3,134,672. Examples of azo dye developers may include the following compounds:

1. 1-Phenyl-3-n-carbobutoxy-4-[p-(2',5'-dihydroxyphenethyl)-phenylazo]-5-pyrazolone.
2. 1-Phenyl-3-(N-2'-ethylhexylcarbamido)-4-[p-(2',5'-dihydroxyphenethyl)-phenylazo]-5-pyrazolone.
3. 1-(p-N,N-Diethylsulfonamidophenyle)-3-N-n-butylcarbamido-4-[p-(2',5'-dihydroxyphenethyl)-phenylazo]-5-pyrazolone.
4. 1-Phenyl-3-N-n-hexylcarbamido-4-[p-(2',5'-dihydroxyphenylpropyl)-phenylazo]-5-pyrazolone.
5. 1-Phenyl-3-trifluoromethyl-4-[p-(2',5'-dihydroxyphenylisobutyl)-phenylazo]-5-pyrazolone.
6. 1-Phenyl-3-N-β-hydroxyethylcarbamido-4-[p-(2',5'-dihydroxyphenethyl)-phenylazo]-5-pyrazolone.
7. 1-Phenyl-3-N-n-hexylcarbamido-4-[p-(2',5'-dihydroxy-4'-methylphenethyl)-phenylazo]-5-pyrazolone.
8. 1-Phenyl-3-N-n-hexylcarbamido-4-[p-(2',5'-dihydroxyphenethyl)-phenylazo]-5-pyrazolone.
9. 1-Phenyl-3-N-n-heptylcarbamido-4-[p-(2',5'-dihydroxyphenethyl)-phenylazo]-5-pyrazolone.
10. 1-Phenyl-3-N-n-hexylcarbamido-4-[p-(2',5'-dihydroxy-4-chlorophenethyl)-phenylazo]-5-pyrazolone.
11. 1-Phenyl-3-trifluoromethyl-4-[p-(2',5'-dihydroxyphenethyl)-phenylazo]-5-pyrazolone.
12. 1-Phenyl-3-phenyl-4-[p-(2',5'-dihydroxyphenethyl)-phenylazo]-5-pyrazolone.
13. 1-Phenyl-3-N-cyclohexylcarbamido-4-[p-(2',5'-dihydroxyphenethyl)-phenylazo]-5-pyrazolone.
14. 1-Phenyl-3-N-n-butylcarbamido-4-[p-(2',5'-dihydroxyphenethyl)-phenylazo]-5-pyrazolone.
15. 1-Phenyl-3-carbethoxy-4-[p-(2',5'-dihydroxyphenethyl)-phenylazo]-5-pyrazolone.
16. 1-Phenyl-3-methyl-4-[p-(2',5'-dihydroxyphenethyl)-phenylazo]-5-pyrazolone.
17. 1-Phenyl-3-amino-4-[p-(2',5'-dihydroxyphenethyl)-phenylazo]-5-pyrazolone.
18. 2-[p-(2',5'-Dihydroxyphenethyl)-o-methylphenylazo]-4-methoxy-1-naphthol.
19. 2-[p-(2',5'-Dihydroxyphenethyl)-phenylazo]-4-isobutoxy-1-naphthol.
20. 2-[p-(2',5'-Dihydroxyphenethyl)-phenylazo]-4-N-methyl-N-phenylsulfonamido-1-naphthol.
21. 2-[p-(2',5'-Dihydroxyphenethyl)-phenylazo]-4-methylsulfonyl-1-naphthol.
22. 2-[m-(2',5'-Dihydroxyphenethyl)-phenylazo]-4-n-propoxy-1-naphthol.
23. 2-[p-(2',5'-Dihydroxyphenethyl)-phenylazo]-4-ethoxy-ethoxy-ethoxy-1-naphthol.
24. 2-[p-(2',5'-Dihydroxyphenethyl)-phenylazo]-4-methylthio-1-naphthol.
25. 2-[p-(2',5'-Dihydroxyphenethyl)-phenylazo]-4-β-chloroethoxy-1-naphtol.
26. 2-[p-(2',5'-Dihydroxyphenethyl)-α-naphthylazo]-4-methoxy-1-naphthol.
27. 2-[p-(2',5'-Dihydroxyphenylisobutyl)-phenylazo]-4-methoxy-1-naphthol.
28. 2-[p-(2',5'-Dihydroxyphenylpropyl)-phenylazo]-4-isopropoxy-1-naphthol.
29. 2-[p-(2',5'-Dihydroxyphenylpropyl)-phenylazo]-4-n-propoxy-1-naphthol.
30. 2-[p-(2',5'-Dihydroxy-4'-methylphenethyl)-phenylazo]-4-N, N-diethylsulfonamido-1-naphthol.
31. 2-[p-(2',5'-Dihydroxy-3',4'-dimethylphenethyl)-phenylazo]-4-methoxy-1-naphthol.
32. 2-[p-(2',5'-Dihydroxyphenethyl)-phenylazo]-4-acetyl-1-naphthol.
33. 2-[p-(2',5'-Dihydroxy-4'-methylphenethyl)-phenylazo]-4-methoxy-1-naphthol.
34. 2-[p-(2',5'-Dihydroxy-4'-methylphenethyl)-phenylazo]-4-n-propoxy-naphthol.
35. 2-[p-(2',5'-Dihydroxyphenethyl)-phenylazo]-4-β-hydroxy-ethoxy-1-naphthol.
36. 2-[p-(2',5'-Dihydroxy-3',4'6'-trimethylphenethyl)-phenylazo]-4 -methoxy-1-naphthol.
37. 2-[p-(2',5'-Dihydroxy-3'-methylphenethyl)-phenylazo]-4-n-propoxy-1-naphthol.
38. 2-[p-(3',4'-Dihydroxyphenethyl)-phenylazo]-4-n-propoxy-1-naphthol.
39. 2-[p-(2',5'-Dihydroxyphenethyl)-o-methoxyphenylazo]-4-N,N-dimethylsulfonamido-1-naphthol.
40. 2-[p-(2',5'-Dihydroxyphenethyl)-phenylazo]-4-hexyloxy-1-naphthol.
41. 2-[p-(2',5'-Dihydroxyphenethyl)-phenylazo]-4-cyclohexyloxy 1-naphthol.
42. 2-[p-(2',5'-Dihydroxyphenethyl)-phenylazo]-4-isopropoxy-1-naphthol.

43. 2-[p-(2',5'-Dihydroxyphenethyl)-phenylazo]-4-n-propoxy-1-naphthol.
44. 2-[p-(2',5'-Dihydroxyphenethyl)-phenylazo]-4-ethoxy-1-naphthol.
45. 2-[p-(2',5'-Dihydroxyphenethyl)-phenylazo]-4-methoxy-1-naphthol.
46. 2-[p-(2',5'-Dihydroxyphenethyl)-phenylazo]-4-acetamido-1-naphthol.
47. 2-[p-(2',5'-Dihydroxyphenethyl)-phenylazo]-4-amino-1-naphthol.
48. 2-[p-(2',5'-Dihydroxyphenethyl)-phenylazo]-4-sulfo-1-naphthol.
49. 5-Amino-8-[p-(2',5'-dihydroxyphenethyl)-phenylazo]-1-naphthol.
50. 5-$\beta$-Hydroxyethylamino-8-[p-(2',5'-dihydroxyphenethyl)-phenylazo]-1-naphthol.
51. 4-[p-(2',5'-Dihydroxyphenethyl)-phenylazo]-5-acetamido-1-naphthol.
52. 1-[p-(2',5'-Dihydroxyphenethyl)-o-methoxyphenylazo]-8-acetamido-2-naphthol.
53. 1-[p-(2',5'-Dihydroxyphenethyl)-phenylazo]-2-naphthol.
54. 4-[p-(2',5'-Dihydroxyphenethyl)-phenylazo]-1-N-ethylaminonaphthalene.
55. 4-[p-(2',5'-Dihydroxyphenethyl)-phenylazo]-1-naphthylamine.
56. 4-[p-(2',5'-Dihydroxyphenethyl)-phenylazo]-5-hydroxyacenaphthene.
57. 8-Amino-5-[p-(2',5'-dihydroxyphenethyl)-phenylazo]-quinoline.
58. 2,5-Dimethoxy-4-[p-(2',5'-dihydroxyphenethyl)-phenylazo]-aniline.
59. 2-Formyl-4-[p-(2',5'-dihydroxyphenethyl)-phenylazo]-phenol.
60. 4-[p-(2',5'-Dihydroxyphenethyl)-phenylazo]-3-phenyl-isooxazolone-5.

The anthraquinone dye developers which can be used in the present invention are well-known compounds and are described in U.S. Pat. Nos. 2,983,605, 2,983,606, and the like. Examples of anthraquinone dye developers may include the following compounds:

61. 1,4-bis-(p-[N-(Hydroquinonylcarbamylmethyl)-amino]-phenylamino)-anthraquinone.
62. 1,4-bis-Hydroquinonylcarbamylmethylamino-anthraquinone.
63. 1,4-bis-($\alpha$-Methyl-$\beta$-hydroquinonylethylamino)-anthraquinone.
64. 1,4-bis-($\alpha$-Methyl-$\beta$-hydroquinonylethylamino)-5,8-dihydroxy-anthraquinone.
65. 1,4-bis-($\alpha$-Methyl-$\beta$-hydroquinonylpropylamino)-5,8-dihydroxy-anthraquinone.
66. 1,4-bis-($\alpha$-Methyl-$\beta$-hydroquinonylpropylamino)-anthraquinone.
67. 1,4-bis-Hydroquinonylmethylaminoanthraquinone.
68. 1,4-bis-($\alpha$-Methyl-$\beta$-hydroquinonylethylamino)-6,7-dichloroanthraquinone.
69. 1,4-bis-($\alpha$-Methyl-2',5'-dihydroxybenzylamino)-anthraquinone.
70. 1,4-bis-($\alpha$-Methyl-$\beta$-hydroquinonylethylamino)-5,8-bis-benzenesulfonamidoanthraquinone.
71. 1,4-bis-($\alpha$-Methyl-$\beta$-hydroquinonylethylamino)-5-hydroxy-8-aminoanthraquinone.
72. 1,4-bis-($\beta$-Hydroquinonylethylamino)-anthraquinone.
73. 1,4-bis-[$\beta$-(3',4'-Dihydroxyphenyl)-ethylamino]-5,8-dihydroxyanthraquinone.
74. 1,4-bis-[$\beta$-(3',4'-Dihydroxyphenyl)-ethylamino]-anthraquinone.
75. 1,4-bis-($\alpha$-Ethyl-$\beta$-hydroquinonylethylamino)-anthraquinone.
76. 1,4-bis-(2',5'-Dihydroxyanilino)-anthraquinone.
77. 1,4-bis-[$\beta$-(Homogentisamido)-ethylamino]-anthraquinone.
78. 1,4-bis-Homogentisamidoanthraquinone.
79. 1,4-bis-(2',5'-Dihydroxyanilino)-anthraquinone.
80. 1,4-bis-[$\beta$-(2',5'-Dihydroxyphenyl)-propylamino]-anthraquinone.
81. 1,4-bis-[1',5'-bis-(2'',5''-Dihydroxyphenyl)-3'-pentylamino]-anthraquinone.
82. N-Monobenzoyl-1,4-bis[$\beta$-(3',4'-dihydroxyphenyl)-ethylamino]-anthraquinone.
83. N-Monobenzoyl-1,4-bis-[$\beta$-(2',5'-dihydroxyphenyl)-ethylamino]-anthraquinone.
84. 1,4-Diamino-N-($\beta$-2',5'-dihydroxyphenyl-$\alpha$-methyl-ethyl)-2,3-anthraquinone-dicarboximide.
85. 1-Amino-4-hydroxy-N-($\beta$-2',5'-dihydroxyphenyl-$\alpha$-methylethyl)-2,3-anthraquinone-dicarboximido.
86. 1-Hydroxy-4-[1',5'-bis-(2'',5''dihydroxyphenyl)-3'-pentyl]-amino-anthraquinone.
87. 1-Amino-4-anilino-2-hydroquinonylsulfamyl-anthraquinone.
88. 1-Aminoethylamino-4-hydroquinonylcarbamylmethylamino-ethylamino-anthraquinone.
89. 1-Amino-4-[p-(N-hydroquinonylcarbamylmethylamino)-phenylamino]-2-anthraquinone-sulfonic acid-Na.
90. 1-($\alpha$-Hydroxymethyl-propylamino)-4-($\alpha$-methyl-$\beta$-hydroquinonyl-ethylamino)-anthraquinone.
91. 1-($\alpha$-Hydroxymethyl-propylamino)-4-($\alpha$-methyl-$\beta$-hydroquinonyl-methylamino)-5,8-dihydroxyanthraquinone.
92. 1-Hydroxy-4-(2',5'-dihydroxyanilino)-anthraquinone.
93. 1-Hydroxy-4-($\alpha$-methyl-hydroquinonylethylamino)-anthraquinone.
94. 1-($\alpha$-Methyl-$\beta$-hydroquinonylethylamino)-4-($\alpha$-ethyl-$\beta$-hydroquinonylethylamino)-anthraquinone.
95. 1-($\alpha$-Methyl-$\beta$-hydroquinonylethylamino)-4-($\alpha$-ethyl-$\beta$-hydroquinonyl-ethylamino)-5,8-dihydroxyanthraquinone.
96. 1-($\alpha$-Hydroxymethyl-propylamino)-4-($\alpha$-methyl-$\beta$-hydroquinonyl-ethylamino)-5-hydroxyanthraquinone.
97. 1-($\alpha$-Hydroxymethylpropylamino)-4-[$\beta$-(4'-methyl-2',5'-dihydroxyphenyl)-$\alpha$-methyl-ethylamino]-anthraquinone.
98. 1-Ethylamino-4-[$\beta$-(3',4'-dihydroxyphenyl)-ethylamino]-anthraquinone.
99. 1-Chloro-4-($\beta$-hydroquinonylethylamino)-anthraquinone.
100. 1-Hydroxy-4-[$\beta$-(3',4'-dihydroxyphenyl)-ethylamino]-anthraquinone.
101. 1-($\beta$-Hydroxyethylamino)-4-($\beta$-hydroquinonylethylamino) anthraquinone.
102. 1-($\beta$-Hydroxyethylamino)-4-($\alpha$-methyl-$\beta$-hydroquinonylethylamino)-5,8-dihydroxyanthraquinone.

103. 1-Methylamino-4-(β-hydroquinonylethylamino)-anthraquinone.

104. 1-β-Hydroxyethylamino-4-(α-methyl-β-hydroquinonylethylamino)-anthraquinone.

105. 1-β-Aminoethylamino-4-β-(homogentisamido)-ethylaminoanthraquinone.

106. 1,5-bis-Hydroquinonylmethylamino-anthraquinone.

107. 1,5-bis-[β-(3',4'-Dihydroxyphenyl)-ethylamino]-anthraquinone.

108. 1,5-bis-(β-Hydroquinonylethylamino)-anthraquinone.

109. 1,5-bis-(α-Methyl-β-hydroquinonyl-ethylamino)-anthraquinone.

110. 1,5-bis-Homogentisamido-4,8-dihydroxy-anthraquinone.

111. 1,5-bis-Homogentisamido-anthraquinone.

112. 1,5-bis-(N-Methyl-homogentisamido)-5,8-dimethylamino-anthraquinone.

113. 1-Chloro-5-(β-hydroquinonylethylamino)-anthraquinone.

114. 1-[β-(3',4'-dihydroxyphenyl)-ethylamino]-5-nitroanthraquinone.

115. 1,8-bis-[β-(3',4'-Dihydroxyphenyl)-ethylamino]-anthraquinone.

116. 1,8-bis-(β-Hydroquinonylethylamino)-anthraquinone.

117. 4,8-bis-(2',5'-Dihydroxyanilino)-anthraquinone.

118. 4-(2',5'-Dihydroxyanilino)-8-chloro-anthraquinone.

119. 1-[p-(β-Hydroquinonyl-ethyl)-phenylamino]-anthraquinone.

120. 1-[β-(3',4'-Dihydroxyphenyl)-ethylamino]-anthraquinone.

121. 1-Homogentisamido-5-amino-4,8-dihydroxy-anthraquinone.

The sensitizing dye used in the present invention is known to be useful for the spectral sensitization of conventionally used silver halide emulsions. However, the use of the dye developer of the present invention was found to result in different aspect of the spectral sensitization from that obtained by the use of the conventionally used silver halide. On the other hand, the higher spectral sensitivity which is obtained by using a combination of two different sensitizing dyes than the spectral sensitivity which is obtained with the dyes individually is known as "super-sensitization", and it was found that in some cases the supersensitization effect can differ significantly even if the dyes used are similar in their chemical structure.

A feature of the sensitizing dye of the present invention represented by the formula (I) is that $R_1$ and $R_2$ as an N-substituent are an alkyl group containing a carboxy group or a sulfo group.

A feature of the sensitizing dye of the present invention represented by the formula (II) is that $R_5$ and $R_6$ are an alkyl group containing a carboxy group or an sulfo group, and $Y_6$ is a group which does not contain an aryl group such as a phenyl group.

That is, when $Y_6$ is a phenyl group, although dye (II) alone has a high sensitivity, the sensitizing effect of the dye was very weak when used in combination with a dye represented by the general formula (I). On the other hand, when $Y_6$ is a group other than a phenyl group, the sensitizing effect of the dye (II) was marked when used in combination with dye (I). (See Example 4, Table 5).

When both $R_1$ and $R_2$ are an alkyl group (for example, an ethyl group), a higher sensitivity than that of the present invention is obtained in the absence of the dye developer, but the sensitivity was remarkably lower in the presence of the dye developer than that of the present invention. The sensitizing dyes which are useful when the anthraquinone dye developer is used are known as disclosed in Japanese Patent Pub. No. 392/1965, but a higher sensitivity than that disclosed in this patent publication was obtained by the use of a combination of the dyes represented by the formula (I) and (II).

It was expected that the combination of the dyes of the present invention would give a good result in the presence of a color coupler dispersion, but it was actually found, as Example 3 demonstrates, that the effect of the combination was unexpectedly excellent in the presence of the dye developer of the present invention in comparison with the effect brought about by the use of the color coupler dispersion.

In the use of a combination of a sensitizing dye and a dye developer, the sensitivity of the green sensitive emulsion is generally lowered markedly by interaction of the sensitizing dye and the dye developer (such interaction is not completely understood but is believed to be due to the densensitization caused by the dye developer). However, this interaction can be reduced and thus a high green sensitive emulsion can be obtained by the use of a combination of the dye and the specific green sensitizing dye of the present invention.

The molar ratio of the sensitizing dyes represented by the formula (II) and that represented by the formula (I) is not critical but is preferably 9:1 to 1:9 and may be varied depending upon the purposes.

The manner of adding sensitizing dyes into the photographic emulsion is known to those skilled in the art for preparing photographic emulsions. Generally, the dyes are added to the photographic emulsion as a solution in solvents such as water, methanol, ethanol and methylcellosolve, separately or in admixture. Ultrasonic vibration may be applied in dissolving the sensitizing dyes in the solvent. The amount of the sensitizing dye to be used may be varied depending upon the nature of the silver halide emulsion and the desired result, and may range preferably from 0.005 to 0.3g per 1 mole of the silver halide in order to obtain optimum sensitization.

Suitable silver halide emulsions which can be used in this invention are silver chloride, silver bromide, silver iodobromide, silver chlorobromide and silver chloriodobromide emulsions and the most preferred emulsion is a silver iodobromide emulsion.

In the present invention, the conventional silver halide gelatin emulsion can be used, but a resinous substance or a cellulose derivative having no deleterious effect on the light sensitive material may be used in place of a part or all of the gelatin.

To the photographic emulsion used in the present invention may be added the conventional additives such as chemical sensitizing agents, fog inhibitors, stabilizers, hardners, coating agents, plasticizers, developing accelerators and air fog inhibitors, and the thus obtained emulsion can be coated in a conventional manner on an appropriate support such as glass, a cellulose film, a synthetic resin film, a synthetic paper, a baryta paper and a photographic paper coated with a polyolefin film.

The image-receiving element used in the present invention is alkaline permeable and comprises an image-receiving layer capable of dyeing the dye developer from the alkaline solution and a support. Thus, it comprises a support having coated thereon an alkaline permeable image-receiving layer which is capable of being dyed. The image-receiving layer contains an agent suitable for mordanting or may have a structure which is capable of immobilizing the diffused unoxidized dye developer. The image-receiving material and the structure of the receiving layer are known, see Japanese Patent Pub. No. 8274/1963, 8449/1963 and 29756/1961, and U.S. Pat. Nos. 3,003,872, 3,043,689, 3,065,074, 3,148,061, 3,239,337, 3,353,956 and 3,362,281.

In some cases, the dyeing layer comprises an alkaline processing composition which is designed to remained adhered to the support upon separation.

Illustrative of the support of the image-receiving element is a synthetic paper, and a baryta paper and preferably a photographic paper coated with a polyolefin layer, but glass, a film or a cellulose derivative and a synthetic resin film may also be used.

FIG. 1 is a sectional view showing an embodiment of preparing a single colored transfer image, wherein A is a support of the photosensitive element, B is a color image-forming substance layer, C is a silver halide emulsion layer, D is an image-receiving layer, E is a support of an image-receiving element and F is a rupturable container.

Figure 2:
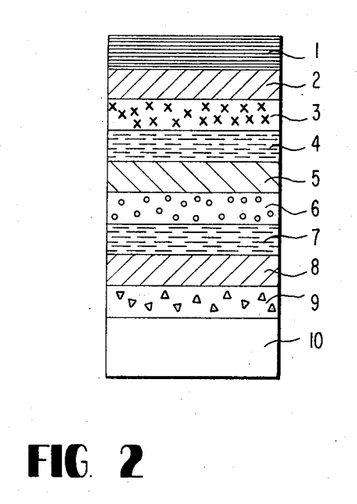
FIG. 2 is a sectional view showing an embodiment of a photosensitive material used for obtaining a multicolored diffusion transfer image.

FIG. 2 is a sectional view showing an embodiment of a photosensitive material used for obtaining a multicolored diffusion transfer image, wherein 10 is a support, 9 is a cyan developer layer, 8 is a red-sensitive emulsion layer, 7 and 4 are interlayers, 6 is a magenta dye developer layer, 5 is a green-sensitive emulsion layer, 3 is a yellow dye developer layer, 2 is a blue-sensitive layer and 1 is a protective layer.

Examples of the present invention are given below, but they are not to be construed as limiting the present invention.

EXAMPLE 1

3 g of a magenta dye developer, 4-isopropoxy-2-[p-($\beta$-hydroquinonylethyl)-phenylazo]-1-naphthol, was dissolved in 16 cc of a solvent mixture of 6 cc of N,N-diethyllaurylamide and 10cc of ethyl acetate while heating at 70°C, and the resulting solution was dispersed and emulsified in 50 cc of 10% gelatin containing 2cc of an aqueous solution of 5% n-dodecylbenzene sodium sulfonate. To this emulsion was added 2 cc of 2% mucochloric acid followed by the addition of water to make up a total volume of 100 cc. The resulting emulsion was then applied to a triacetate cellulose support to form a film thereon having a dry thickness of 5 $\mu$. Over this layer was coated a green-sensitive silver iodobromide emulsion layer containing $3.5 \times 10^{-2}$ mol of silver and 4.8 g of gelatin per 100 g of the emulsion containing the sensitizing dyes in the combinations as shown below (in Table 1) in a dry thickness of 2 $\mu$. Then, an emulsion prepared by dissolving 1 g of 4'-methyl-phenylhydroquinone in a solvent mixture consisting of 2 cc of N,N-diethyllaurylamide and 4 cc of ethyl acetate, dispersing and emulsifying the resulting solution in 20 cc of 10% aqueous gelatin solution containing 1 cc of 5% n-dodecylbenzene sodium sulfonate aqueous solution and adding 2 cc of 2% mucochloric acid to the thus obtained emulsion followed by making up to a total volume of 50 cc was coated upon the above green-sensitive layer in a dry thickness of 0.8 $\mu$.

The thus obtained film was disposed under the optical wedge which continuously changes in optical density, exposed to the light, and immersed into an alkaline agent having the following composition;

| Alkaline Agent Composition: | |
|---|---|
| Highly viscous Hydroxyethyl Cellulose | 3.5 g |
| NaOH | 4.0 g |
| Benzotriazole | 2.0 g |
| 1-Phenethyl-2-picolinium bromide | 2.0 g |
| Water | 100 cc |

The film was then allowed to stand for 2 minutes while bringing into contact with an image-receiving sheet having the following composition followed by separation to obtain a positive colored transfer image on the image-receiving sheet having a low density in the area exposed to a large amount of light and a high density in the area exposed to a small amount of light.

Structure of the Image-receiving Sheet

The sheet was prepared by coating a gelatin layer containing a mixture of poly-4-vinyl-pyridine mordant and 1-phenyl-5-mercapto-tetrazole on a baryta support to a dry thickness of 10 $\mu$.

For the purpose of comparison, samples were prepared in the same manner as above but using each of dyes separately instead of using a combination of the dyes in preparing the emulsion.

The reflective density of the image obtained upon the image receiving sheet was measured using a densitometer to determine the exposure amount at a reflective density of 1.0. The results obtained are shown in the following Tables 1 and 2.

Table 1

| No. of Test | Sensitizing Dye (ml/100 g of emulsion) | Sensitivity | *1)Green-Sensitivity in green sensitive layer as a sole layer*2) |
|---|---|---|---|
| 1 | I-1(2) | 72.5 | 98.0 |
| 2 | do. (4) | 100 | 100 |
| 3 | do. (8) | 89.0 | 91.0 |
| 4 | II-6(2) | 18.5 | 30.2 |
| 5 | do. (4) | 24.0 | 23.9 |
| 6 | do. (8) | 23.4 | 32.5 |
| 7 | i-1(2) II-6(2) | 200 | 159 |
| 8 | do. (2) do. (4) | 282 | 195 |
| 9 | do. (4) do. (4) | 264 | 148 |

Table 2

| No. of Test | Sensitizing Dye (ml/100 g emulsion) | | Sensitivity*1) |
|---|---|---|---|
| 10 | I-2(2) | | 76.6 |
| 11 | do. (4) | | 100 |
| 12 | do. (8) | | 72.5 |
| 13 | II-7(2) | | 32.4 |
| 14 | do. (4) | | 33.9 |
| 15 | do. (8) | | 32.4 |
| 16 | I-2(2) | II-7(2) | 166 |
| 17 | do. (2) | do. (4) | 230 |
| 18 | do. (4) | do. (4) | 195 |
| 19 | I-9(2) | | 74.0 |
| 20 | do. (4) | | 100 |
| 21 | do. (8) | | 89.0 |
| 22 | II-1(2) | | 17.8 |
| 23 | do. (4) | | 23.5 |
| 24 | do. (8) | | 21.4 |
| 25 | I-9(2) | | 219 |
| 26 | do. (2) | do. (4) | 234 |
| 27 | do. (4) | do. (4) | 299 |

Note: In the above Tables 1 and 2, Test Nos. 1-6, 10-15 and 19-24 were run for the comparative purposes, the concentration of the sensitizing dye in the solution was $1 \times 10^{-3}$ mol/l.
*1): The relative vlaue of the reciprocal of the exposure amount E required for a D = 1.
*2): The value obtained by processing in a black and white developer a sample which was prepared by coating a green-sensitive emulsion on a triacetate cellulose support. (The Green Filter was Fuji Filter No. 17 produced by the Fuji Photo Film Co., Ltd.).

EXAMPLE 2

2 g of a yellow dye developer, 1-phenyl-3-N-n-hexylcarboxyamido-4-[p-(2',5'-dihydroxyphenethyl)-phenylazo]-5-pyrazolone, was dissolved in a solvent mixture of 2 cc of tricresylphosphate and 5 cc of cyclohexane while heating. The thus obtained solution was dispersed and emulsified in 50 cc of 10% gelatin containing 2 cc of 5% aqueous sodium n-dodecylbenzene sulfonate. To a mixture was added 1 cc of a 2% aqueous solution of 2-hydroxy-4,6-dichloro-s-triazine to make up a total volume of 100 cc, and the thus obtained emulsion was coated on a triacetate cellulose support to a dry thickness of 4 μ.

A coating of a green-sensitive silver iodobromide emulsion layer containing the green sensitizing dyes in the combinations as shown in Table 3, 4.8 g of gelatin and $3.5 \times 10^{-2}$ mol of silver per 100 g of the emulsion was then placed over the yellow dye developer layer to a dry thickness of 2 μ.

1 g of 4'-methyl-phenylhydroquinone was dissolved in a solvent mixture of 2 cc of N,N-diethyllaurylamide and 4 cc of ethyl acetate, and the resulting solution was dispersed and emulsified in 20 cc of 10% aqueous gelatin solution containing 1 cc of aqueous solution of 5% sodium n-dodecylbenzene sulfonate. To the resulting emulsion was added 2 cc of 2% mucochloric acid followed by the addition of water to make up a total volume of 50 cc, and a coating of the emulsion was then placed over the green-sensitive emulsion layer to a dry thickness of 0.8 μ. For the purposes of comparison, samples were prepared in the same manner as described above but using each of the sensitizing dyes separately.

The thus obtained films were processed in the same manner as described in Example 1 to obtain a dye developer transfer image on the image-receiving sheet. The exposure amount at a reflection density of 1.0 is shown in Table 3 below.

Table 3

| No. of Test | Sensitizing dye (ml/100 g emulsion) | | Sensitivity*) |
|---|---|---|---|
| 28 | I-4(2) | | 69.2 |
| 29 | do. (4) | | 100 |
| 30 | do. (8) | | 9.12 |
| 31 | II-4(2) | | 10.3 |
| 32 | do. (4) | | 14.1 |
| 33 | do. (8) | | 12.3 |
| 34 | I-4(2) | II-4(2) | 182 |
| 35 | do. (2) | do. (4) | 200 |
| 36 | do. (4) | do. (4) | 200 |

Note: *): The expression of the sensitivity is the same as that in Table 1.

In the Table, Test Nos. 28-33 are run for comparative purposes. The concentration of the sensitizing dye in the solution was $1 \times 10^{-3}$ mol/l.

EXAMPLE 3

5 g of a cyan dye developer, 5,8-dihydroxy-1,4-bis-[(β-hydroquinonyl-α-methyl)-ethylamino]anthraquinone, was dissolved in a solvent mixture of 10 cc of N-n-butyl-acetanilide and 2 cc of methyl alcohol, and the thus obtained solution was dispersed and emulsified in 50 cc of 10% gelatin containing 3 cc of 5% sodium n-dodecylbenzene sulfonate. To the resulting emulsion was added 2 cc of 2% aqueous 2-hydroxy-4,6-dichloro-s-triazine solution followed by the addition of water to make up a total volume of 100 cc, and coated over a triacetate cellulose support to a dry thickness of 5 μ. Separately, an emulsion was prepared by dissolving 20 g of 4'-methylphenylhydroquinone in a solvent mixture of 2 cc of N-n-butylacetoanilide and 4 cc of ethylacetate, and dispersing and emulsifying the resulting solution in 20 cc of 10% aqueous gelatin solution containing 1 cc of 5% sodium n-dodecylbenzene sulfonate. To 20 g of the thus obtained emulsion was added a silver iodobromide emulsion containing the combination of the sensitizing dyes as shown in Table 4 in an amount of $4.7 \times 10^{-2}$ mol of silver and 5.3 g of gelatin per 100 g of the emulsion, and the resulting emulsion was coated over the above cyan dye developer layer to a dry thickness of 2.5 μ. Over the thus obtained layers, 100 cc of 3% gelatin containing 1 cc of 2% 2-hydroxy-4,6-dichloro-s-triazine was coated to a dry thickness of 0.8 μ. For comparative purposes, samples were prepared in the same manner as described above but using the same sensitizing dyes separately instead of as a combination thereof.

The thus obtained films were processed in the same manner as described in Example 1, and the dye developer transfer image was obtained on the image receiving sheet. The exposure amount at a reflection density of 1.0 is shown in Table 4.

Table 4

| No. of Test | Sensitizing Dye (ml/100 g emulsion) | | Sensitivity *1) | Green Sensitivity in green sensitive layer as a sole layer*2) | |
|---|---|---|---|---|---|
| | | | | Absence of Coupler | Presence of Coupler |
| 37 | I-1(2) | | 72.5 | 95.5 | 93.2 |
| 38 | do. (4) | | 100 | 100 | 100 |
| 39 | do. (8) | | 81.2 | 89.0 | 89.0 |
| 40 | II-3(2) | | 24.0 | 20.4 | 10.0 |
| 41 | do. (4) | | 26.3 | 25.1 | 15.6 |
| 42 | do. (8) | | 25.8 | 24.0 | 13.5 |
| 43 | I-1(2) | II-3(2) | 234 | 132 | 93.1 |
| 44 | do. (2) | do. (4) | 234 | 138 | 109 |
| 45 | do. (4) | do. (4) | 209 | 138 | 115 |

Note:
*1): The expression of the sensitivity is the same as that in Table 1.
*2): These values were obtained by processing in a black and white developer the samples in which a coating of the green-sensitive emulsion was placed on a triacetate cellulose film. The green filter used was Fuji Filter No. 17.

Test Nos. 28–33 are run for comparative purposes.

In the table, the "Absence of Coupler" column refers to the use of the same green-sensitive emulsion as employed in this Example but without the coupler. The "Presence of Coupler" column refers to the use of an emulsion prepared in the same manner as the preparation of cyan dye developer emulsion except using 10 g of 1-hydroxy-N-n-dodecyl-2-naphthamide instead of the cyan dye developer and adding the resulting emulsion to the same green-sensitive emulsion in an amount of 20g/100 g of the green-sensitive emulsion.

The concentration of the sensitizing dye in the solution is $1 \times 10^{-3}$ mol/l.

The results obtained on comparison with a dye represented by the following chemical structure (III) are shown in Table 5.

(III)

Table 5

| No. of Test | Sensitizing Dye (ml/100 g emulsion) | | Sensitivity *1) |
|---|---|---|---|
| 46 | I-1(2) | | 81.2 |
| 47 | do. (4) | | 100 |
| 48 | do.(8) | | 87.2 |
| 49 | II-1(2) | | 18.2 |
| 50 | do.(4) | | 24.0 |
| 51 | do.(8) | | 22.9 |
| 52 | III(2) | | 70.5 |
| 53 | do.(4) | | 53.7 |
| 54 | do.(8) | | 51.2 |
| 55 | I-1(2) | II-1(2) | 229 |
| 56 | do.(2) | do.(4) | 263 |
| 57 | do.(4) | do.(4) | 246 |
| 58 | I-1(2) | III(2) | 155 |
| 59 | do.(2) | do.(4) | 135 |
| 60 | do.(4) | do.(4) | 118 |

Note: *1): The expression of the sensitivity is the same as that in Table 1.

In the table, the concentration of the sensitizing dye in the solution is $1 \times 10^{-3}$ mol/l.

EXAMPLE 4

A multi-layer film was prepared by coating successively the following layers on a triacetate cellulose support (10 in FIG. 2). FIG. 2 illustrates a diagram showing the structure of the thus obtained film.

1. Cyan dye developer layer (FIG. 2 layer 9)

10 g. of 1,4-bis($\alpha$-methyl-$\beta$-hydroquinonylethylamino)-anthraquinone was completely dissolved in a solvent mixture of 10 cc of N,N-diethyllaurylamide and 20 cc of ethyl acetate while heating at 60°C for 20 minutes. The resulting solution was dispersed and emulsified in 100 cc of 10 percent gelatin containing 10 cc of 5% sodium n-dodecylbenzene sulfonate. To the resulting emulsion was added 4 cc of 2% 2-hydroxy-4,6-dichloro-s-triazine followed by the addition of water ot make up a total volume of 200 cc, and the thus obtained emulsion was coated to a dry thickness of 6.0 $\mu$ to obtain a cyan dye developer layer.

2. Red-sensitive emulsion layer (FIG. 2, layer 8)

A red-sensitive silver iodobromide emulsion containing $4.7 \times 10^{-2}$ mol of silver and 5.3 g of gelatin per 100 g of the emulsion was coated upon the cyan dye developer layer to a dry thickness of 5.2 $\mu$.

3. Interlayer (FIG. 2, layer 7)

3 g of phenylhydroquinone was dissolved in a solvent mixture of 3 cc of N-diethyllaurylamide and 8 cc of cyclohexane, and the solution was emulsified and dispersed in 30 cc of 10% gelatin containing 5% n-sodium dodecylbenzene sulfonate. 30 g of the resulting emulsion was then added to 100 cc of 5% gelatin and the thus obtained emulsion was coated upon the red-sensitive emulsion layer to a dry thickness of 4.2 $\mu$.

4. Magneta dye developer layer (FIG. 2, layer 6)

7 g of 4-ethoxy-2-[p-($\beta$-hydroxyethyl)-phenylaso-1-naphthol was dissolved in a solvent mixture of 7 cc of N,N-diethyllaurylamide and 14 cc of ethyl acetate while heating, and the resulting solution was emulsified and dispersed in 100 cc of 10% gelatin containing 7 cc of 5% sodium n-dodecylbenzene sulfonate. To the thus obtained emulsion was added 4 cc of 2% hydroxy-4,6-dichloro-s-triazine followed by the addition of water to make up a total volume of 200 cc which was then coated on the interlayer to a dry thickness of 40 $\mu$.

5. Green-sensitive emulsion layer (FIG. 2, layer 5)

A green-sensitive emulsion containing the combination of the sensitizing dyes as shown in Table 6 to which was added a silver iodobromide emulsion containing 3.5 × 10$^{-2}$ mol of silver and 4.8 g of gelatin per 100 g of the emulsion was coated upon the magenta layer to a dry thickness of 1.3 μ.

6. Interlayer (FIG. 2, layer 4)

The same coating as shown in (3) above, the interlayer, was placed over the green-sensitive emulsion layer to a dry thickness of 3.5 μ.

7. yellow dye developer layer (FIG. 2, layer 3)

5 g of 1-phenyl-3-N-n-butyl-carboxyamido-4-[p-(2',5'-dihydroxyphenethyl)-phenylazo]-5-pyrazolone was dissolved in a solvent mixture of 5 cc. of N,N-diethyllaurylamide and 14 cc of ethyl acetate, and the resulting solution was emulsified and dispersed in 100 cc of 10% gelatin containing 5 cc of 5% sodium n-dodecylbenzene sulfonate. To the thus obtained emulsion was added 4 cc of 2% 2-hydroxy-4,6-dichloro-s-triazine followed by the addition of water to make up a total volume of 200 cc which was then coated upon the second interlayer to a dry thickness of 3.5 μ.

8. Blue-sensitive emulsion layer (FIG. 2, layer 2)

A blue-sensitive silver iodobromide emulsion containing 3.6 × 10$^{-2}$ mol of silver and 5.3 g of gelatin per 100 g of the emulsion was coated upon the yellow dye developer layer to a dry thickness of 2.5 μ.

9. Protective layer (FIG. 2, layer 1)

100 cc of the same coating solution as shown in (3) above to which was added 4 cc of 2% mucochloric acid was coated upon the blue-sensitive emulsion layer to a dry thickness of 1μ.

Blue and red lights were applied to the entire surface of the thus obtained film so as to expose the blue and red sensitive emulsion layers, and the film was then disposed behind the optical wedge which continuously changes the density to expose to a green light. The film was immersed with the alkaline processing agent as described in Example 1 and contacted with the image receiving sheet as described in Example 1 for 2 minutes and finally separated to obtain a positive magenta dye developer transfer color image on the image receiving sheet. The density of the image receiving sheet was measured using a densitometer to determine the exposure amount at a density of 1.0. The results obtained are shown in Table 6.

Table 6

| No. of Test | Sensitizing Dye (ml/100 g emulsion) | | Sensitivity* |
| --- | --- | --- | --- |
| 61 | I-1(4) | | 93.0 |
| 62 | do.(8) | | 100 |
| 63 | II-1(4) | | 38.9 |
| 64 | do.(8) | | 34.7 |
| 65 | I-1(2) | II-1(2) | 251 |
| 66 | do.(2) | do.(4) | 289 |
| 67 | do.(4) | do.(4) | 289 |

Note: *): The expression of the sensitivity is the same as that in Table 1.

In the table, Test Nos. 61–64 were run for comparative purposes. The concentration of the sensitizing dye in the solution was 1 × 10$^{-3}$ mol/l.

What is claimed is:

1. A photosensitive material for use in a silver diffusion transfer process, which comprises a green-sensitive silver halide photographic emulsion coated on a support and having an azo or an anthraquinone dye developer of the type used in silver diffusion transfer processes in said emulsion or in a photographic layer adjacent said emulsion, said emulsion containing, in combination, at least one of the sensitizing dyes represented by the formula I wherein $R_1$, $R_2$, $R_3$ and $R_4$ are each selected from the group consisting of an alkyl group, an aralkyl group, and an allyl group, at least one of $R_1$ and $R_2$ being an alkyl group containing a carboxy group or a sulfo group; $Y_1$ and $Y_3$ are each selected from the group consisting of a hydrogen atom and a halogen atom; $Y_2$ and $Y_4$ are each selected from the group consisting of a hydrogen atom, a halogen atom, an alkoxy group, an amino group, an acylamido group, an acyloxy group, an alkoxycarbonylamino group, a cyano group, a trifluoromethyl group, an alkylsulfonyl group, a sulfamyl group, an alkylaminosulfonyl group, an alkoxycarbonyl group, a morpholinosulfonyl group and a piperidinosulfonyl group; $X_1$ represents an anion; $n$ is an integer of from 1 to 2, the sensitizing dye forming an intramolecular salt when $n$ is 1; and at least one of the sensitizing dyes represented by the formula (II)

wherein Y is selected from the group consisting of a sulfur atom and a selenium atom; Z and $Z_1$ each represents a divalent group necessary to form an unsubstituted benzene ring or a benzene ring substituted with at least one substituent selected from the group consisting of a halogen atom, a hydroxy group, an alkyl group, and an alkoxy group; $R_5$ and $R_6$ are each selected from the group consisting of an alkyl group, at least one of $R_5$ and $R_6$ being an alkyl group having a carboxy group or a sulfo group; $X_2$ is an anion, $p$ is an integer of from 1 to 2, said sensitizing dye of formula (II) forming an intramolecular salt when $p$ is 1.

2. The photosensitive material of claim 1, in which said emulsion contains, in combination, at least one of the sensitizing dyes represented by the formula (I) in which at least two of $Y_2$, $Y_3$ and $Y_4$ are a halogen atom and at least one of the sensitizing dyes, within the formula (II), is represented by the formula (II')

(II')

wherein R represents a hydrogen atom or an alkyl group, and Y, $R_5$, $R_6$, $X_2$ and $p$ are as defined in claim 1.

3. The photosensitive material of claim 2, wherein said alkyl group for R is a methyl group or an ethyl group.

4. The photosensitive material of claim 1, wherein said substituted alkyl group for $R_1$, $R_2$, $R_3$, $R_4$, $R_5$ and $R_6$ is an alkyl group containing substituents selected from the group consisting of hydroxy, acetoxy, alkoxy, carboxy, sulfo, and aryl.

5. The photosensitive material of claim 1, wherein said sensitizing dye of the formula I and said sensitizing dye of the formula II are present in said emulsion in a molar ratio of from about 9:1 to 1:9.

6. The photosensitive material of claim 1, wherein said silver halide is silver chloride, silver bromide, silver iodobromide, silver chlorobromide or silver chloroiodobromide.

7. The photosensitive material of claim 6, wherein said silver halide is silver iodobromide.

8. The photosensitive material of claim 1 wherein said dye developer is an azo dye developer.

9. The photosensitive material of claim 1 wherein said dye developer is an anthraquinone dye developer.

10. The photosensitive material of claim 1 wherein said $R_1$, $R_2$, $R_3$, $R_4$, $R_5$ or $R_6$ is a substituted alkyl group and said substituent is selected from the group consisting of hydroxy, acetoxy, alkoxy, carboxy, carboxyalkoxy, carboxyaryl, sulfo, sulfohydroxy, sulfoalkoxy, sulfoacetoxy, sulfoalkoxyalkoxy, sulfo-alkoxyhydroxy, sulfoaryl, aryl and vinyl.

11. The photosensitive material of claim 1 wherein said dye developer comprises a dye moiety and a second moiety capable of developing exposed silver halide.

12. The photosensitive material of claim 11 wherein said dye developer is non-diffusible normally but is rendered diffusible in the presence of an alkaline photographic processing solution.

13. The photosensitive material of claim 11 wherein said dye moiety is an azo dye moiety or an anthraquinone dye moiety, and wherein said second moiety comprises an aromatic developing moiety which forms a quinone substance upon oxidation.

14. The photosensitive material of claim 13 wherein said second moiety comprises a hydroquinonyl group, an ortho-di-hydroxy phenyl group, an ortho-amino substituted hydroxy phenyl group or a para-amino substituted hydroxy phenyl group.

15. The photosensitive material of claim 11 wherein said substituted alkyl group of said $R_1$, $R_2$, $R_3$, $R_4$, $R_5$ and $R_6$ is selected from the group consisting of 2-hydroxyethyl; 4-hydroxybutyl; 2-acetoxyethyl; 3-carboxypropyl; 2-(2-carboxyethoxy)ethyl; p-carboxybenzyl; 2-sulfoethyl; 3-sulfopropyl; 3-sulfobutyl; 4-sulfobutyl; 2-hydroxy-3-sulfopropyl; 2-(3-sulfopropoxy)ethyl; 2-acetoxy-3-sulfopropyl; 3-methoxy-2-(3-sulfopropoxy)propyl; 2-[2-(3-sulfopropoxy) ethoxy]ethyl; 2-hydroxy-3-(3'-sulfopropoxy)propyl; p-sulfophenethyl; p-sulfobenzyl; benzyl; phenylethyl and allyl.

16. The photosensitive material of claim 11 wherein said $Y_2$ and $Y_4$ are each selected from the group consisting of hydrogen, chlorine, bromine, iodine, fluorine, methoxy, ethoxy, butoxy, amino, methylamino, dimethylamino, acetoamido, acetoxy, ethoxycarbonylamino, cyano, trifluoromethyl, methylsulfonyl, sulphamyl, ethylaminosulfonyl, diethylaminosulfonyl, methoxycarbonyl and ethoxycarbonyl.

17. The photosensitive material of claim 2 wherein said emulsion contains at least one of the sensitizing dyes represented by said formula I and at least one of the sensitizing dyes represented by the following formula wherein Z, $R_5$, $R_6$, $X_2$ and p are as defined in claim 2 and wherein $Y_6$ is selected only from the group consisting of halogen, hydroxy, alkyl and alkoxy groups.

18. The photosensitive material of claim 1 wherein the amounts of sensitizing dyes present in said emulsion is within the range of from 0.005 to 0.3 gram per mole of silver halide in said emulsion.

19. A method for increasing the green sensitization of the silver halide photographic emulsion of a photosensitive material comprising said emulsion coated onto a support, wherein an azo or an anthroguinone dye developer of the type used in silver diffusion transfer processes is contained in said emulsion or in a layer adjacent the silver halide emulsion layer, said dye developer having a dye moiety and a second moiety capable of developing exposed silver halide, said method comprising adding to said emulsion a super-sensitizing combination of sensitizing dyes comprising, in combination, at least one of the sensitizing dyes represented by the formula wherein $R_1$, $R_2$, $R_3$ and $R_4$ are each selected from the group consisting of an alkyl group, an aralkyl group, and an allyl group, at least one of $R_1$ and $R_2$ being an alkyl group containing a carboxy group or a sulfo group; $Y_1$ and $Y_3$ are each selected from the group consisting of a hydrogen atom and a halogen atom; $Y_2$ and $Y_4$ are each selected from the group consisting of a hydrogen atom, a halogen atom, an alkoxy group, an amino group, an acylamido group an acyloxy group, an alkoxycarbonylamino group, a cyano group, a trifluoromethyl group, an alkylsulfonyl group, a sulfamyl group, an alkylaminosulfaonyl group, an alkoxycarbonyl group, a morpholinosulfonyl group and a piperidinosulfonyl group; $X_1$ represents an anion; $n$ is an integer of from 1 to 2, the sensitizing dye forming an intramolecular salt when $n$ is 1; and at least one of the sensitizing dyes represented by the formula wherein Y is selected from the group consisting of a sulfur atom and a selenium atom; Z and $Z_1$ each represents a divalent group necessary to form an unsubstituted benzene ring or a benzene ring substituted with at least one substituent selected from the group consisting of a halogen atom, a hydroxy group, an alkyl group, and an alkoxy group; $R_5$ and $R_6$ are each selected from the group consisting of an alkyl group, at least one of $R_5$ and $R_6$ being an alkyl group having a carboxy group or a sulfo group; $X_2$ is an anion, $p$ is an integer of from 1 to 2, said sensitizing dye of formula (II) forming an intramolecular salt when $p$ is 1.

20. The method of claim 19 wherein, in at least one of the sensitizing dyes represented by said formula (I), at least two of said $Y_2$, $Y_3$ and $Y_4$ are halogen atoms, and wherein at least one of the sensitizing dyes, within said formula (II), is represented by the formula (II')

wherein R represents a hydrogen atom or an alkyl group, and Y, $R_5$, $R_6$, $X_2$ and $p$ are as defined in claim 19.

21. The method of claim 19 wherein said $R_1$, $R_2$, $R_3$, $R_4$, $R_5$ or $R_6$ is a substituted alkyl group and said substituent is selected from the group consisting of hydroxy, acetoxy, alkoxy, carboxy, carboxyalkoxy, carboxyaryl, sulfo, sulfohydroxy, sulfoalkoxy, sulfoacetoxy, sulfoalkoxyalkoxy, sulfoalkoxyhydroxy, sulfoaryl, aryl and vinyl.

22. The method of claim 19 wherein the molar ratio of said sensitizing dye of said formula I to said sensitizing dye of said formula II ranges from 9:1 to 1:9.

23. The method of claim 19 wherein said silver halide is silver chloride, silver bromide, silver iodobromide, silver chlorobromide, or silver chloroiodobromide.

24. The method of claim 19 wherein said dye moiety of said dye developer is an azo dye or an anthraquinone dye moiety, and wherein said second moiety of said dye developer comprises an aromatic developing moiety which forms a quinone substance upon oxidation.

25. The photosensitive material of claim 1 wherein $R_1$, $R_2$, $R_3$, $R_4$, $R_5$ or $R_6$ is an alkyl group selected from the class consisting of a hydroxyalkyl group, an acetoxyalkyl group, an alkoxyalkyl group, a carboxy-containing alkyl group and an alkyl group containing a sulfo group.

26. The method of claim 19 wherein $R_1$, $R_2$, $R_3$, $R_4$, $R_5$ or $R_6$ is an alkyl group selected from the class consisting of a hydroxyalkyl group, an acetoxyalkyl group, an alkoxyalkyl group, a carboxy-containing alkyl group and an alkyl group containing a sulfo group.

* * * * *